(No Model.) 2 Sheets—Sheet 1.

J. F. STEWARD.
HARVESTER COVERING.

No. 311,542. Patented Feb. 3, 1885.

Witnesses:
W. J. Lukens
P. H. Middlekauff

Inventor:
John F. Steward (No Model.)         2 Sheets—Sheet 2.
J. F. STEWARD.
HARVESTER COVERING.
No. 311,542.                Patented Feb. 3, 1885.
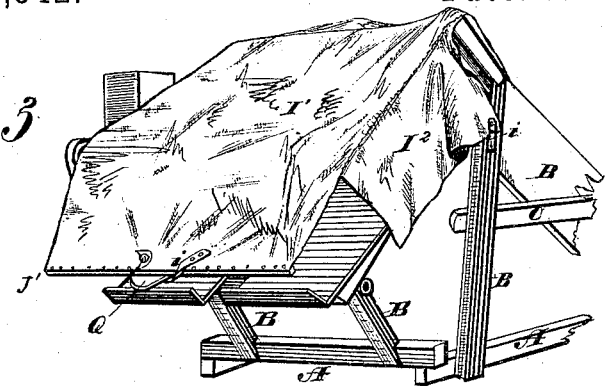
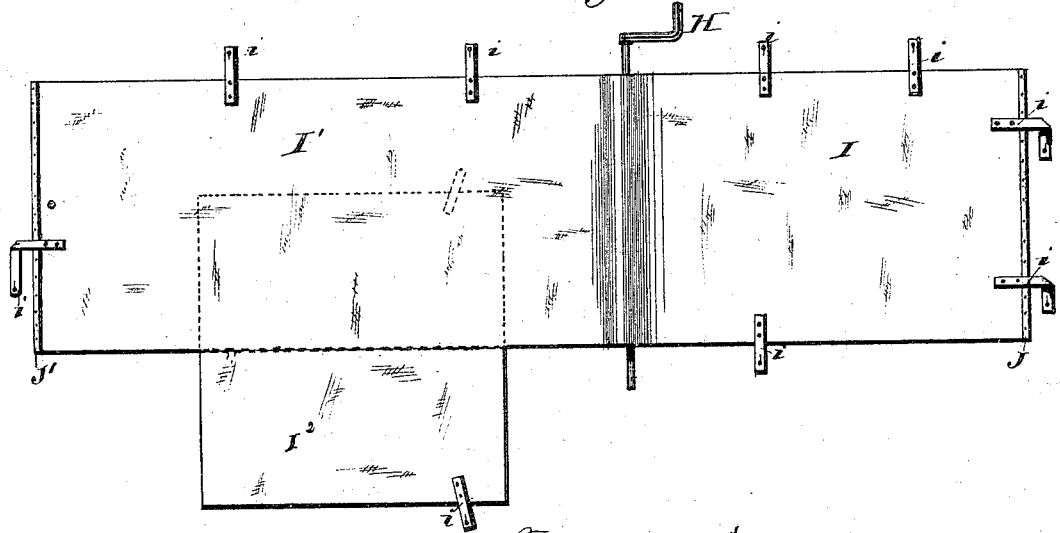
Witnesses:
W. J. Lukins
P. H. Middlekauff
Inventor:
John F. Steward

UNITED STATES PATENT OFFICE.

JOHN F. STEWARD, OF CHICAGO, ILLINOIS.

HARVESTER-COVERING.

SPECIFICATION forming part of Letters Patent No. 311,542, dated February 3, 1885.

Application filed May 7, 1883. (No model.)

*To all whom it may concern:*

Be it known that I, JOHN F. STEWARD, a citizen of the United States, residing at 410 Seminary avenue, in the city of Chicago, county of Cook, and State of Illinois, have invented new and useful Improvements in Harvester-Coverings, of which the following is a full specification, reference being had to the accompanying drawings, in which—

Figure 1:
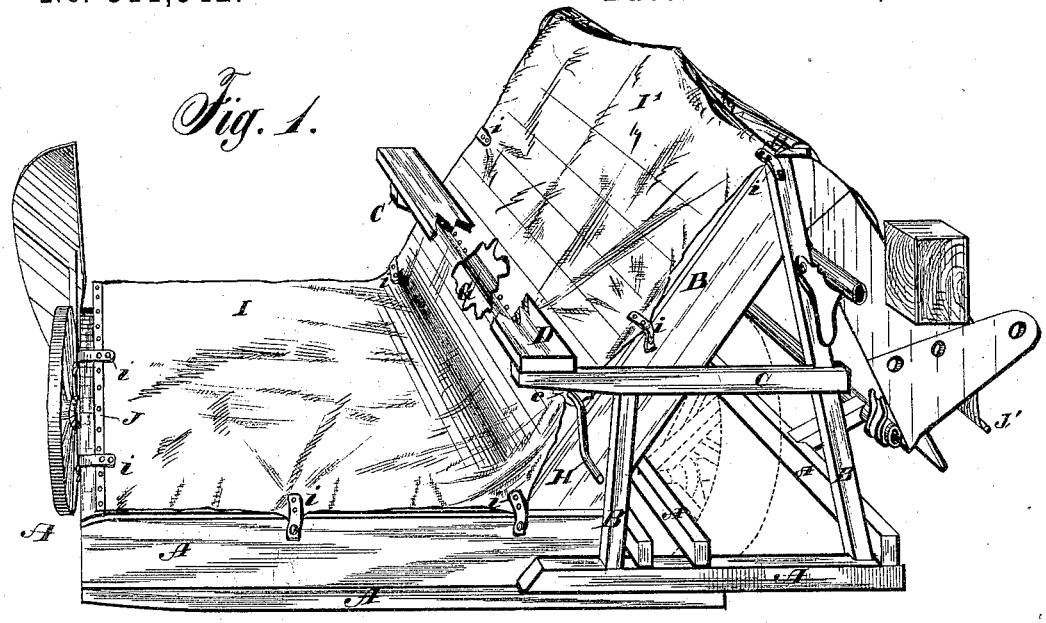
Figure 2:
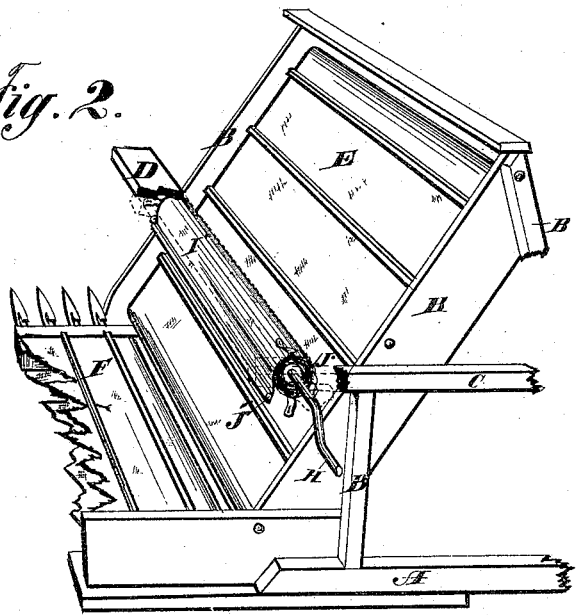

Figure 1 is a perspective view of the harvester frame and covering, as seen from a position in rear and a little to the left of the machine, certain parts being broken away to expose those beneath. Fig. 2 is a similar view showing the canvas covering rolled up. Fig. 3 is a perspective view of the binder side of the harvester. Fig. 4 is a plan view of the canvas covering outstretched, as if laid on the ground. Fig. 5 is an end view of the roller, showing the canvas tacked thereto, and the way the flaps are laid one upon the other when the roller winds them up.

The object of my invention is to provide a covering for a harvester, so connected with the frame of the same that it may be let out to shield the works, particularly the conveyer and elevating devices when they themselves are of canvas and subject to injury from rains, and that it may be taken up into any out-of-the-way position to prepare the machine for its work; and it consists in combining a canvas covering and for taking up the canvas covering with the harvester-frame, as will be pointed out and claimed.

A A in the drawings are the sills and other horizontal parts of the frame of the harvester.

B are the upright parts.

C C are horizontal bars, secured to the uprights for supporting the board D, upon which is usually mounted the reel and driver's seat.

In the frame-work are rollers for driving the elevating-canvases. The upper elevator is shown at $E^2$. Along the platform is drawn the conveying-apron F.

G is a roller of sufficient length to reach across the harvester-frame from front to rear, preferably beneath the seat-board D, as such is the most out-of-the-way position, having journals boxed in the bearings $c$ underneath the ends of the bars C C. At the rear end of the roller the journal is cranked at H, outside of the bearing, to serve as means for revolving the roller to wind up the canvas covering.

I I' $I^2$ is the canvas covering, made of suitable ducking chemically prepared, to better shed rain, if thought desirable, consisting in effect of one piece, that part lettered I extending over the conveying-canvas, that marked I' extending upward over the main body of the harvester and binder attachment, and the flap $I^2$ reaching downward over the butt adjusting-canvas, as shown in Fig. 3.

J and J' are slats tacked across the ends of the covering to keep them stretched—parts not necessary, but desirable. At suitable intervals along the ends and edges of the covering are riveted or otherwise secured the slotted ears, of leather or other suitable material, and in corresponding positions on the framework are button-headed nails. By these means the canvas covering when drawn out can be properly secured.

With the roller G located under the seat-board, or near that position, the part I' of the covering is longer than I, and hence when the whole is rolled the end of I' will be on the outside of the roll, as seen in Fig. 2. I tack the canvas to the roller G preferably upon its upper surface when the canvas is stretched out, so that the water is shed over it rather than under it, and into a groove between it and the canvas, if it were tacked below. The water that is shed along down the part I' and that which falls on I will flow off in front of the latter when the machine is slightly tilted forward or when the tongue is resting with its end on the ground.

The operation is as follows: With the canvas covering rolled up (shown in Fig. 2) while working the machine, it is only necessary to take hold of the slat J' and carry it from underneath the roller G upward and over the elevator-frame. This operation will also unroll the part I of the canvas and leave it gathered on the platform conveying-canvas under the roller, when it may be drawn out and all the parts buttoned or otherwise secured in the outstretched position.

To prepare the machine for work, the ears are unbuttoned, the flap $I^2$ is folded over onto the main part of the covering, as shown in dotted lines in Fig. 4, the crank H is turned, and the whole canvas is drawn in and rolled up in one operation into the position shown in Fig. 2.

What I claim is—

In a harvester, the roller G, in combination with the canvas covering, the parts I and I' of said canvas extending in opposite directions from said roller, whereby the canvas may be wound upon the roller with less number of revolutions of the latter than if said canvas extended in one direction only, substantially as set forth.

JOHN F. STEWARD.

Witnesses:
W. J. LUKENS,
P. D. MIDDLEKAUFF.